(12) United States Patent
Swann et al.

(10) Patent No.: US 6,357,790 B1
(45) Date of Patent: Mar. 19, 2002

(54) APPARATUS FOR USE WITH CHILD A CHILD SEAT IN A VEHICLE HAVING A SEAT BELT WEBBING PRETENSIONER

(75) Inventors: Timothy A. Swann, Mesa; John W. Nicklos, Chandler; Ahmad K. Al-Amin, Higley; Roy D. Van Wynsberghe, Mesa; Bryan W. Shirk, Mesa; Eric C. Erike, Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/488,280

(22) Filed: Jan. 20, 2000

(51) Int. Cl.[7] .................................................. B60R 21/32
(52) U.S. Cl. ...................................... 280/735; 280/806
(58) Field of Search ............................... 180/268, 271; 280/806, 735

(56) References Cited

U.S. PATENT DOCUMENTS

| | | | |
|---|---|---|---|
| 2,834,606 A | * | 5/1958 | Bertrand |
| 5,101,926 A | | 4/1992 | Berman et al. |
| 5,454,591 A | | 10/1995 | Mazur et al. |
| 5,605,348 A | | 2/1997 | Blackburn et al. |
| 5,683,103 A | | 11/1997 | Blackburn et al. |
| 5,783,871 A | | 7/1998 | LeMense |
| 5,785,347 A | | 7/1998 | Adolph et al. |
| 5,790,031 A | | 8/1998 | Shelton et al. |
| 5,868,427 A | | 2/1999 | Mueller et al. |
| 5,871,063 A | | 2/1999 | Young |
| 5,871,236 A | | 2/1999 | Bauer et al. |
| 5,873,599 A | | 2/1999 | Bauer et al. |
| 5,892,435 A | | 4/1999 | Buchheim et al. |
| 6,123,357 A | * | 9/2000 | Hosoda et al. ........... 280/730.2 |

* cited by examiner

*Primary Examiner*—Paul N. Dickson
(74) *Attorney, Agent, or Firm*—Tarolli, Sundheim, Covell, Tummino & Szabo L.L.P.

(57) ABSTRACT

An apparatus (10) for use with a removable child seat (12) in a vehicle (14) comprises a vehicle seat (20) on which a removable child seat may or may not be present, and a seat belt webbing pretensioner (40) for retracting seat belt webbing (30) associated with the vehicle seat. A first sensor (58) provides a first output signal in response to a vehicle collision of a magnitude above a predetermined threshold. A second sensor (60) provides a second output signal in response to the presence of a child seat (12) on the vehicle seat (20). A controller (50) receives the first and second output signals and, in response to the first output signal, actuates the seat belt webbing pretensioner (40) when a child seat (12) is not present on the vehicle seat (20) and inhibits actuation of the seat belt webbing pretensioner when a child seat is present on the vehicle seat.

8 Claims, 8 Drawing Sheets

US 6,357,790 B1

APPARATUS FOR USE WITH CHILD A CHILD SEAT IN A VEHICLE HAVING A SEAT BELT WEBBING PRETENSIONER

TECHNICAL FIELD

The present invention relates to an apparatus for use with a removable child seat in a vehicle having a seat belt webbing pretensioner. The present invention is particularly directed to an apparatus for disabling the seat belt webbing pretensioner associated with a given vehicle seat when a removable child seat is located on that vehicle seat.

BACKGROUND OF THE INVENTION

It is known to sense the presence of a rearward facing infant child seat in a vehicle, and to prevent the actuation of an inflatable occupant restraint, such as an air bag, when the presence of such a child seat is sensed. The rearward facing infant child seat is detected using an identifiable tag attached to the child seat and an antenna coil mounted in the vehicle. The antenna coil transmits an EMF signal to the tag, which, in turn, returns a signal to the antenna coil indicating the presence of the rearward facing infant child seat on the vehicle seat.

It is also known to utilize a seat belt webbing pretensioner to help protect a vehicle occupant from injury during a vehicle collision. The seat belt webbing pretensioner is actuatable to retract seat belt webbing extending over the body of the vehicle occupant and thereby to remove any slack in the seat belt webbing immediately prior to the vehicle collision.

If a child seat is secured to a vehicle seat by seat belt webbing having an associated pretensioner, it is desirable to disable the pretensioner. It is further desirable to disable the pretensioner regardless of whether the child seat is rearward facing or forward facing or whether the child seat is located on a front seat of the vehicle or on a rear seat of the vehicle.

SUMMARY OF THE INVENTION

An apparatus for use with a removable child seat in a vehicle comprises a vehicle seat on which a removable child seat may or may not be present, and a seat belt webbing pretensioner for retracting seat belt webbing associated with the vehicle seat. A first sensor provides a first output signal in response to a vehicle collision of a magnitude above a predetermined threshold. A second sensor provides a second output signal in response to the presence of a child seat on the vehicle seat. A controller receives the first and second output signals and, in response to the first output signal, actuates the seat belt webbing pretensioner when a child seat is not present on the vehicle seat and inhibits actuation of the seat belt webbing pretensioner when a child seat is present on the vehicle seat.

A pretensioner actuation circuit for actuating the seat belt webbing pretensioner is electrically connected with and controlled by the controller. The second sensor comprises an antenna coil mounted in the vehicle and an identification tag for attachment to a child seat. The antenna coil is adapted to transmit an electromagnetic field (EMF) signal to the identification tag and to receive a return EMF signal from the identification tag. The identification tag is adapted to receive an EMF signal from the antenna coil and to use energy of the received EMF signal to generate a return EMF signal.

In accordance with certain embodiments of the present invention, the vehicle seat comprises one of a front passenger seat and a rear passenger seat and a child seat is locatable on the one passenger seat to face rearward of the vehicle.

In accordance with other embodiments of the invention, the vehicle seat comprises one of a front passenger seat and a rear passenger seat and a child seat is locatable on the one passenger seat to face forward of the vehicle.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENTS

Figure 1:
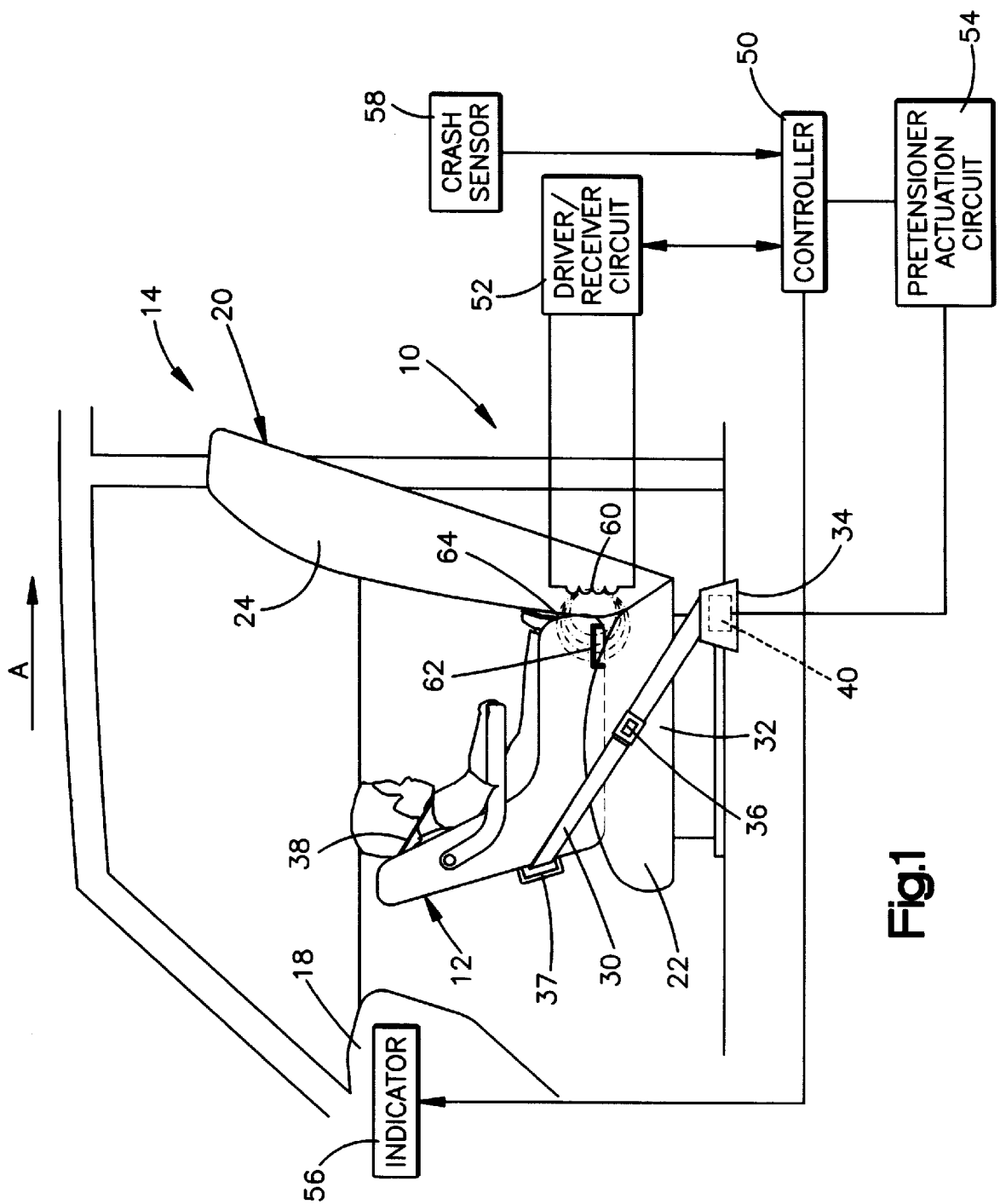
FIG. 1 is a schematic illustration of an apparatus for use with a removable child seat in a vehicle having a seat belt webbing pretensioner.

FIG. 1 schematically illustrates an apparatus 10 for use with a removable child seat 12 in a vehicle 14 having a seat belt webbing pretensioner 40. The vehicle 10 includes an instrument panel 18 and a vehicle seat 20 having a seat cushion 22 and a seat back 24. In accordance with a first embodiment of the present invention, the vehicle seat 20 illustrated in FIG. 1 is a front passenger seat.

The child seat 12 is secured to the vehicle seat 20 in a rearward facing direction, indicated by arrow A, by seat belt webbing 30. The seat belt webbing 30 is secured to the vehicle floor on an inboard side 32 of the vehicle seat 20 through a mounting assembly 34 and a buckle 36, as is well known in the art. The seat belt webbing 30 extends through a belt holder 37 of the child seat 12 and is secured to the vehicle floor on an outboard side (not shown) where a seat belt webbing retractor (not shown) is located. The child seat 12 includes a three-point restraining harness 38 that is typical for removable child seats.

The seat belt webbing pretensioner 40 is a known device secured inside the mounting assembly 34. The pretensioner 40 is actuatable by an electrical signal. When actuated, the pretensioner 40 pulls the buckle 36 toward the mounting assembly 34 and tightens the seat belt webbing 30 immediately prior to a vehicle collision, as is known in the art.

The apparatus 10 includes a controller 50 operatively connected to a driver/receiver circuit 52. The controller 50 is further controllably connected to a pretensioner actuation circuit 54 and to a visual warning indicator 56 mounted in the instrument panel 18. The pretensioner actuation circuit 54 is operatively coupled with the seat belt webbing pretensioner 40.

At least one vehicle crash sensor 58 is mounted in the vehicle 14. The crash sensor 58 is electrically connected to and monitored by the controller 50. The crash sensor 58 can be any of several known crash sensors, including inertia switches or accelerometers, that provide an electric signal to the controller 50 indicative of sudden vehicle deceleration above a predetermined magnitude.

The driver/receiver circuit 52 is operatively connected with an antenna coil 60. The antenna coil 60 is located in the seat back 24 of the vehicle seat 20 near where the seat back meets the seat cushion 22. The driver/receiver circuit 52 is operable to energize the antenna coil 60 with periodic pulses and then monitor the antenna coil for a returning electromagnetic field (EMF) signal.

The apparatus 10 further includes a child seat identification tag 62 secured to the child seat 12. The tag 62 is secured near a front end 64 of the child seat 12 by appropriate securing means, such as glue, or by injection molding the tag into a plastic part of the child seat. When the child seat 12 is secured in the rearward facing direction A on the front passenger seat 20 as shown in FIG. 1, the front end 64 of the child seat 12 is adjacent the seat back 24 of the passenger seat. The distance between the antenna coil 60 in the seat back 24 and the identification tag 62 on the child seat 12 is a few inches or less, and is well within the effective range of an EMF signal transmitted by the antenna coil.

As set forth in detail in U.S. Pat. No. 5,683,103, the tag 62 is made from a highly permeable amorphous material that is reactive when subjected to an EMF signal. When the tag 62 is within the range of the EMF signal produced by the energized antenna coil 60, the tag's amorphous material is stressed by the EMF signal, thereby creating a change in the magnetic permeability of the material. This change in the magnetic permeability results in passive EMF waves radiating from the tag 62 at the tag's mechanical natural frequency. The EMF waves radiating from the tag 62 are received by the antenna coil 60 and are transformed by the antenna coil into a received signal which is recognizable by the driver/receiver circuit 52.

When the vehicle's electrical system is active, the driver/receiver circuit 52 continuously energizes the antenna coil 60 to produce an EMF signal. The driver/receiver circuit 52 simultaneously continuously monitors the antenna coil 60 for a return EMF signal radiating from the tag 62 on the child seat 12. When the child seat 12 is present on the passenger seat 20, a return signal from the tag 62 is detected by the driver/receiver circuit 52. The driver/receiver circuit 52 then sends a corresponding signal to the controller 50 indicating the presence of the child seat 12 on the passenger seat 20. Based on this signal, the controller 50, through appropriate circuitry (not shown), inhibits actuation of the pretensioner 40 by electrically disabling the pretensioner actuation circuit 54. The controller 50 also causes the warning indicator 56 in the instrument panel 18 to illuminate, thereby informing the vehicle occupants that the pretensioner 40 associated with the passenger seat 20 on which the child seat 12 is located is disabled.

When the vehicle's electrical system is active, the controller 50 is continuously monitoring the output of the crash sensor 58. If the crash sensor 58 detects sudden vehicle deceleration above a predetermined magnitude indicative of a vehicle collision, the crash sensor sends a signal to the controller 50. If the controller 50 has disabled the pretensioner actuation circuit 54 because the child seat 12 is present on the passenger seat 20, the pretensioner 40 associated with that passenger seat will not be actuated. It should be understood that pretensioners (not shown) associated with other seats (not shown) in the vehicle 14 may nevertheless be actuated by the controller 50 when a vehicle collision is detected. However, if the controller 50 has not disabled the pretensioner actuation circuit 54 because the child seat 12 is not present on the passenger seat 20, the pretensioner 40 associated with that passenger seat will be actuated to remove slack in the seat belt webbing 30 early in the vehicle collision.

Figure 2:
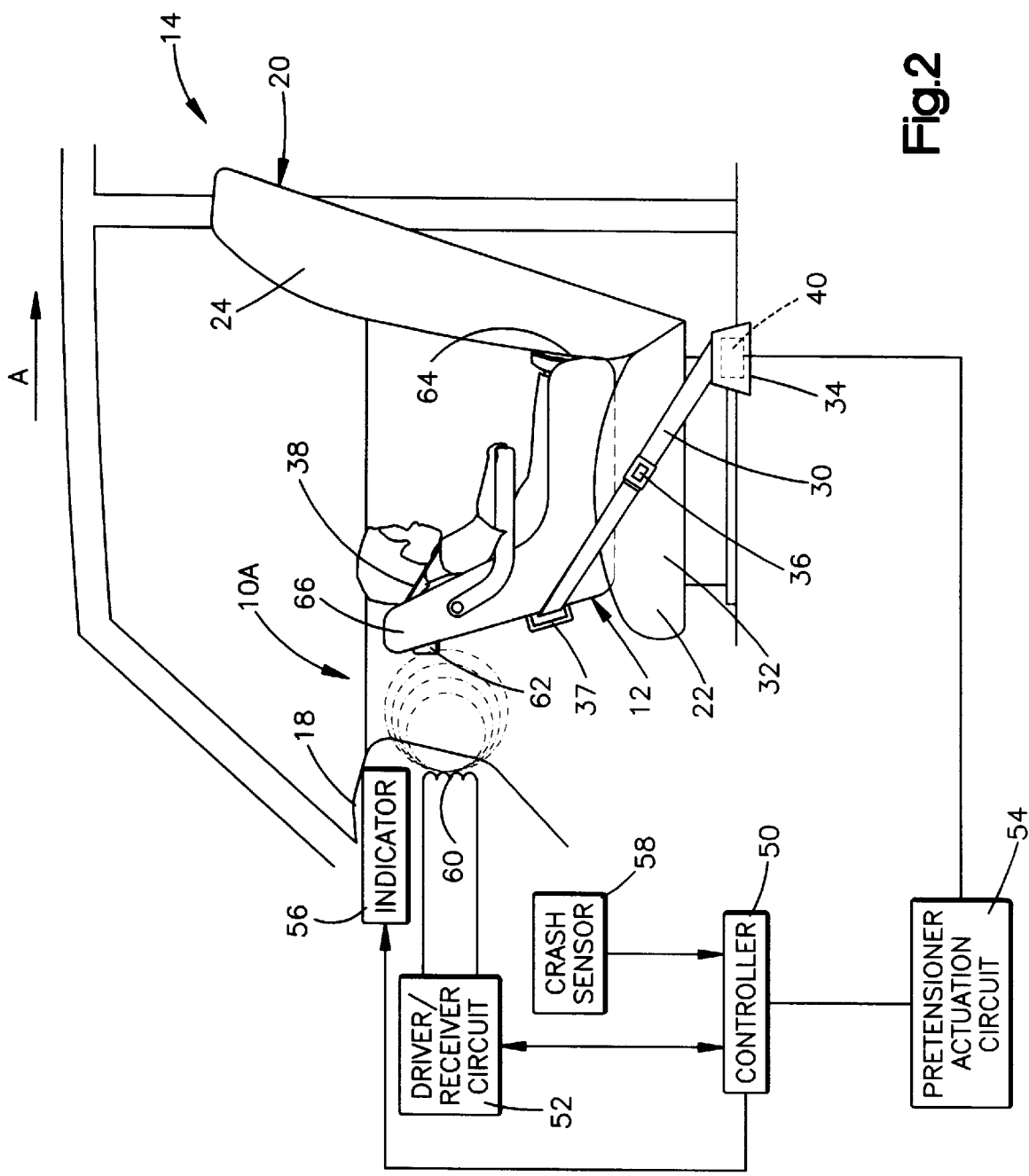
FIG. 2 illustrates a second embodiment of the present invention.

FIG. 2 illustrates an apparatus 10A constructed in accordance with a second embodiment of the present invention in which the respective locations of the antenna coil 60 and the tag 62 are different from the embodiment of FIG. 1. Otherwise, the remainder of the structure is the same as described above regarding the embodiment of FIG. 1. As shown in FIG. 2, the antenna coil 60 is mounted in the instrument panel 18 and the identification tag 62 is secured to an upper rear portion 66 of the child seat 12. Those skilled in the art will appreciate that the circuitry in the driver/receiver circuit 52 and in the controller 50 will be selected to compensate for the increased distance between the antenna coil 60 and the tag 62.

The apparatus 10A according to the second embodiment functions in the same manner as the embodiment of FIG. 1 to inhibit actuation of the pretensioner 40 when the child seat 12 is present on the vehicle seat 20.

Figure 3:
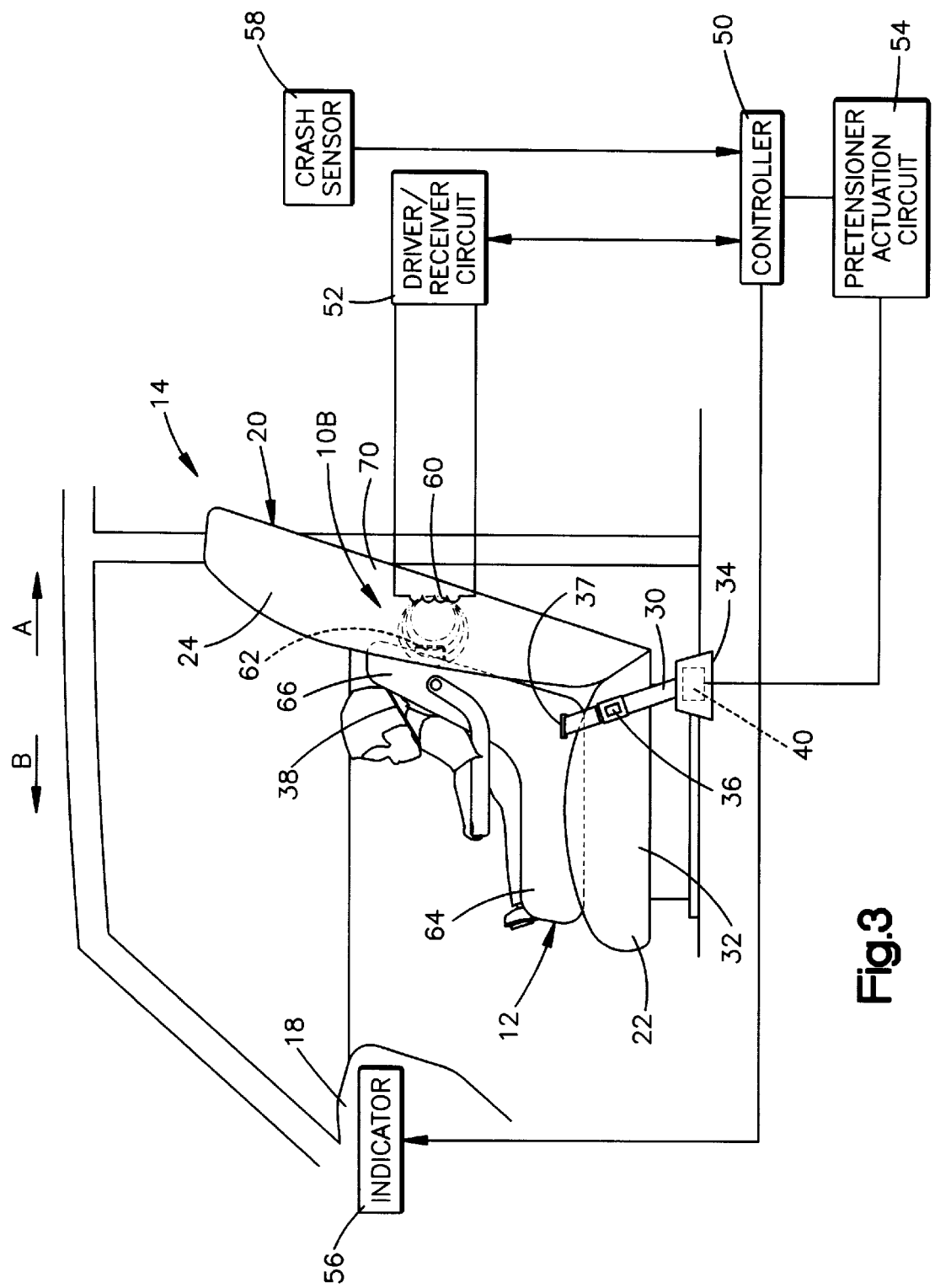
FIG. 3 illustrates a third embodiment of the present invention.

FIG. 3 illustrates an apparatus 10B constructed in accordance with a third embodiment of the present invention. In FIG. 3, the child seat 12 is secured to the vehicle seat 20 in a forward facing direction, indicated by arrow B, by the seat belt webbing 30. The respective locations of the antenna coil 60 and the tag 62 are also different from the embodiments of FIGS. 1 and 2. Otherwise, the remainder of the structure is the same as described above regarding the previous embodiments. As shown in FIG. 3, the antenna coil 60 is mounted in an upper portion 70 of the seat back 24 of the passenger seat 20 while the identification tag 62 is secured to the upper rear portion 66 of the child seat 12. Those skilled in the art will appreciate that the circuitry in the driver/receiver circuit 52 and in the controller 50 will be selected to accommodate for the distance between the antenna coil 60 and the tag 62.

The apparatus 10B according to the third embodiment functions in the same manner as the previous embodiments to inhibit actuation of the pretensioner 40 when the child seat 12 is present on the vehicle seat 20.

Figure 4:
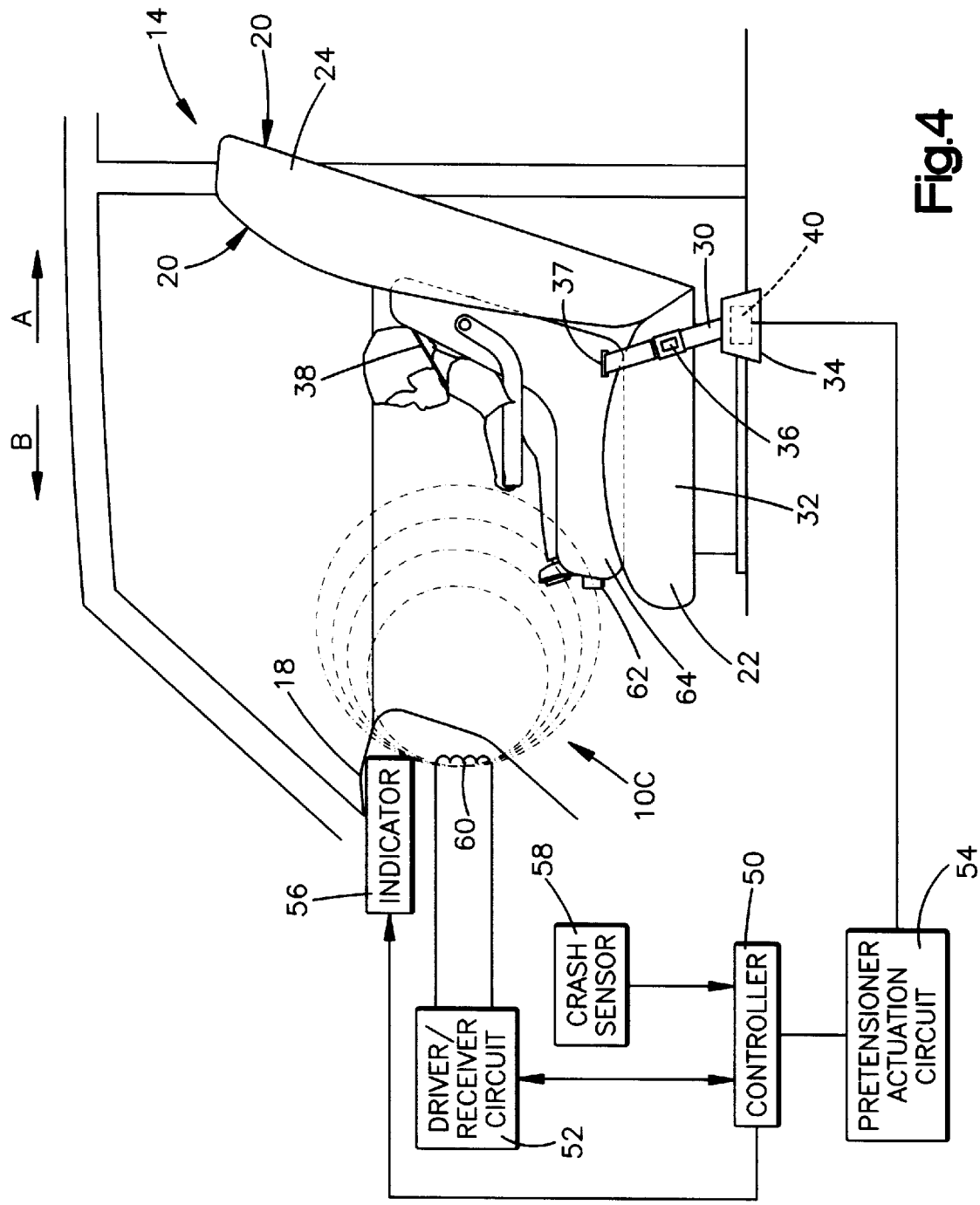
FIG. 4 illustrates a fourth embodiment of the present invention.

FIG. 4 illustrates an apparatus 10C constructed in accordance with a fourth embodiment of the present invention. In FIG. 4, the child seat 12 is secured to the vehicle seat 20 in the forward facing direction B by the seat belt webbing 30. Otherwise, the remainder of the structure is the same as described above regarding the previous embodiments. As shown in FIG. 4, the antenna coil 60 is mounted in the instrument panel 18 while the identification tag 62 is secured to the front end 64 of the child seat 12. Those skilled in the art will appreciate that the circuitry in the driver/receiver circuit 52 and in the controller 50 will be selected to accommodate for the distance between the antenna coil and the tag.

The apparatus 10C according to the fourth embodiment functions in the same manner as the previous embodiments to inhibit actuation of the pretensioner 40 when the child seat 12 is present on the vehicle seat 20.

Figure 5:
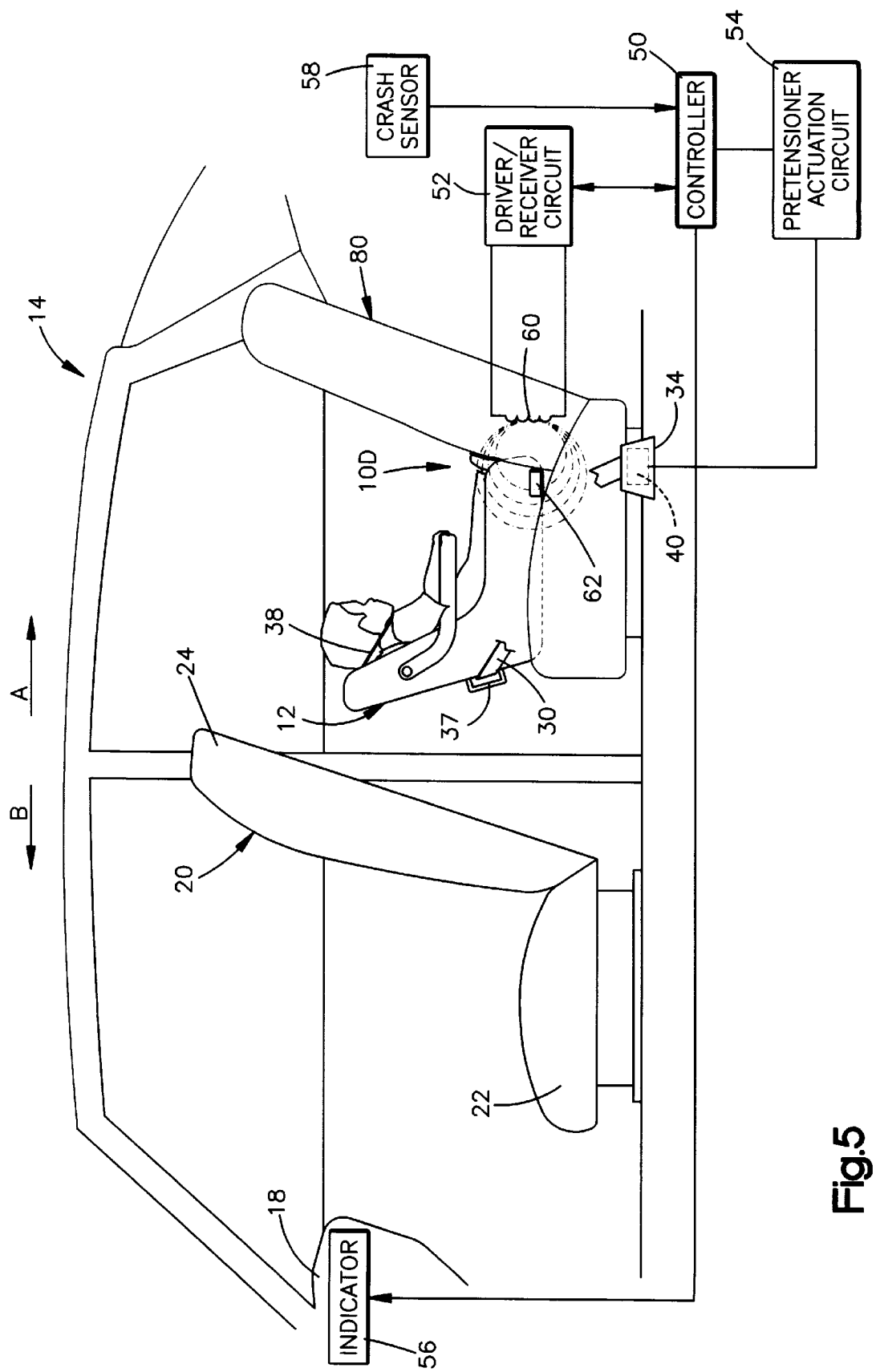
FIG. 5 illustrates a fifth embodiment of the present invention.

FIG. 5 illustrates an apparatus 10D constructed in accordance with a fifth embodiment of the present invention which differs from the embodiment of FIG. 1 only in that the child seat 12 is secured to a rear passenger seat 80 in the vehicle 14, rather than the front passenger seat 20. Otherwise, the remainder of the structure is the same as described above regarding FIG. 1. The apparatus 10D according to the fifth embodiment functions in the same manner as the previous embodiments to inhibit actuation of the pretensioner 40 when the child seat 12 is present on the rear passenger seat 80.

Figure 6:
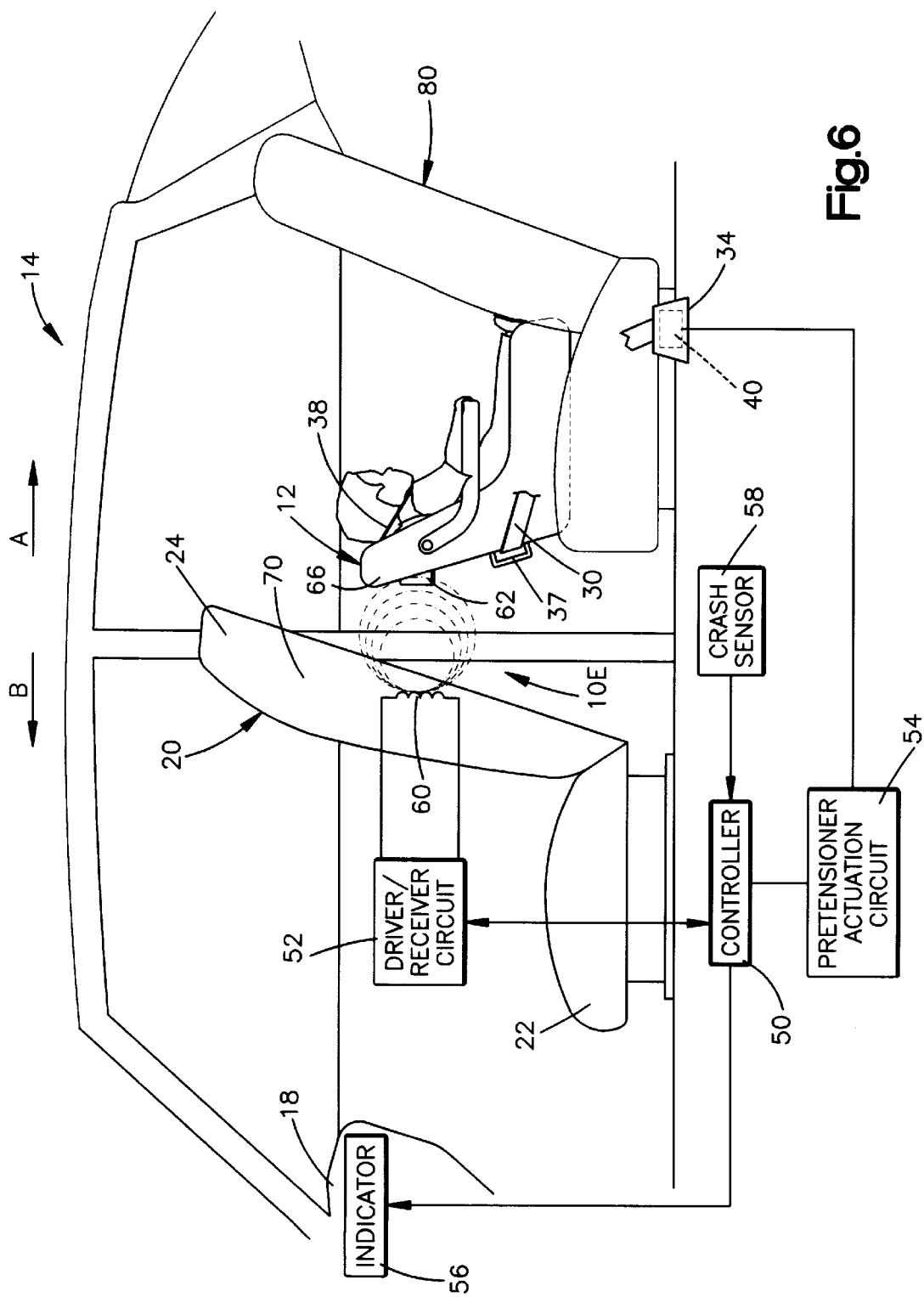
FIG. 6 illustrates a sixth embodiment of the present invention.

FIG. 6 illustrates an apparatus 10E constructed in accordance with a sixth embodiment of the present invention which differs from the embodiment of FIG. 2 in that the child seat 12 is secured to the rear passenger seat 80 in the vehicle 14. Further, the antenna coil 60 is mounted in the upper portion 70 of the seat back 24 of the front passenger seat 20 and faces toward the rear seat 80. Otherwise, the remainder of the structure is the same as described above regarding FIG. 2. The apparatus 10E according to the sixth embodiment functions in the same manner as the previous embodiments to inhibit actuation of the pretensioner 40 when the child seat 12 is present on the rear passenger seat 80.

Figure 7:
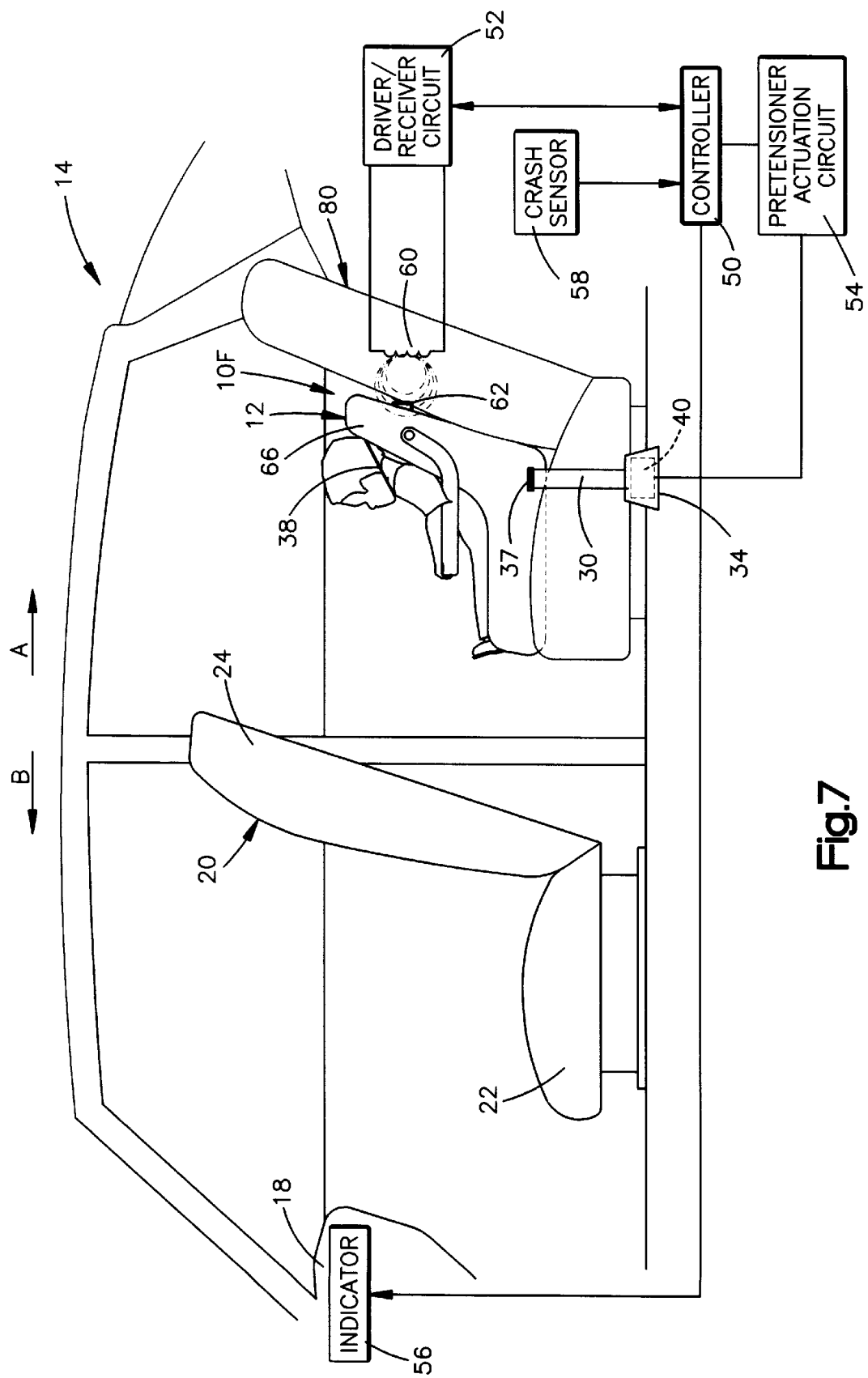
FIG. 7 illustrates a seventh embodiment of the present invention.

FIG. 7 illustrates an apparatus 10F constructed in accordance with a seventh embodiment of the present invention. In FIG. 7, the child seat 12 is secured to the rear passenger seat 80 in the forward facing direction B by the seat belt webbing 30. The antenna coil 60 is mounted in a seat back 82 of the rear passenger seat 80 and the tag 60 is secured to the upper rear portion 66 of the child seat 12. Otherwise, the remainder of the structure is the same as described above regarding the previous embodiments. Those skilled in the art will appreciate that the circuitry in the driver/receiver circuit 52 and in the controller 50 will be selected to accommodate for the distance between the antenna coil 60 and the tag 62.

The apparatus 1OF according to the seventh embodiment functions in the same manner as the previous embodiments to inhibit actuation of the pretensioner 40 when the child seat 12 is present on the vehicle seat 80.

Figure 8:
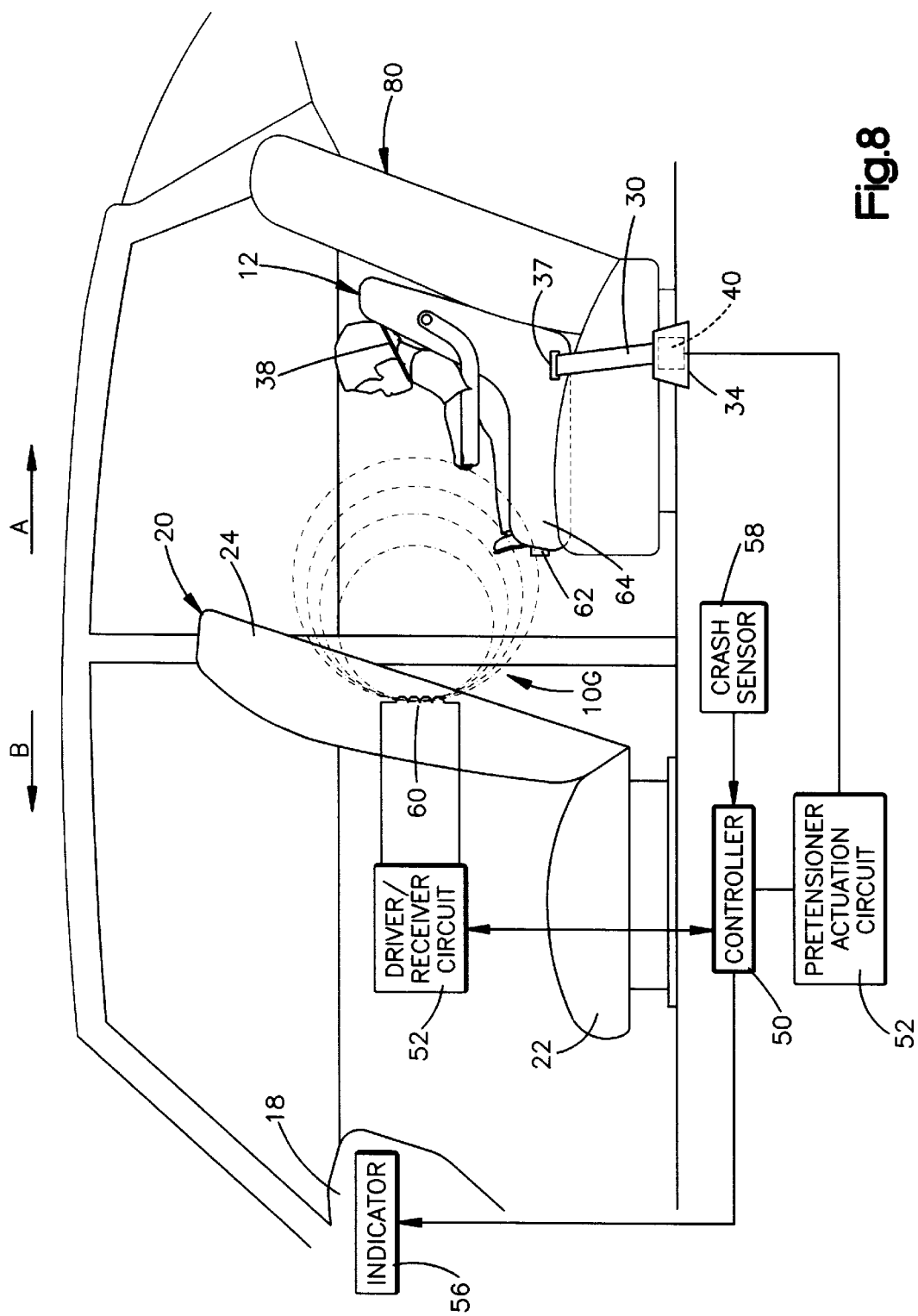
FIG. 8 illustrates an eighth embodiment of the present invention.

FIG. 8 illustrates an apparatus 10G constructed in accordance with an eighth embodiment of the present invention. In FIG. 8, the child seat 12 is secured to the rear passenger seat 80 in the forward facing direction B by the seat belt webbing 30. As shown in FIG. 8, the antenna coil 60 is mounted in the seat back 24 of the front passenger seat 20 and faces toward the rear passenger seat 80. The identification tag 60 is secured to the front end 64 of the child seat 12. Otherwise, the remainder of the structure is the same as described above regarding the previous embodiments. Those skilled in the art will appreciate that the circuitry in the driver/receiver circuit 52 and in the controller 50 will be selected to accommodate for the distance between the antenna coil 60 and the tag 62.

The apparatus 10G according to the eighth embodiment functions in the same manner as the previous embodiments to inhibit actuation of the pretensioner 40 when the child seat 12 is present on the vehicle seat 80.

From the above description of the invention, those skilled in the art will perceive improvements, changes and modifications. For example, other types of sensing devices could be used in place of the antenna coil 60 and the tag 62, such as RF transponders, Hall effect sensors, polarized optical sensors, and light reflectors. Such improvements, changes and modifications within the skill of the art are intended to be covered by the appended claims.

Having described the invention, we claim:

1. Apparatus for use with a removable child seat in a vehicle, said apparatus comprising:

a vehicle seat on which a removable child seat may or may not be present;

a seat belt webbing pretensioner for retracting seat belt webbing associated with said vehicle seat;

a first sensor for providing a first output signal in response to a vehicle collision of a magnitude above a predetermined threshold;

a second sensor for providing a second output signal in response to the presence of a child seat on said vehicle seat;

a controller for receiving said first and second signals and, in response to said first output signal, for actuating said seat belt webbing pretensioner when a child seat is not present on said vehicle seat and inhibiting actuation of said seat belt webbing pretensioner when a child seat is present on said vehicle seat; and a visual indicator operatively coupled with said controller to receive a signal from said controller indicating the presence of a child seat on said vehicle seat and to provide a visual indication that actuation of said seat belt webbing pretensioner is inhibited.

2. Apparatus as defined in claim 1 further including pretensioner actuation circuit for actuating said seat belt webbing pretensioner, said pretensioner actuation circuit being electrically connected with and controlled by said controller.

3. Apparatus as defined in claim 1 wherein said second sensor comprises an antenna coil mounted in the vehicle and an identification tag for attachment to a child seat.

4. Apparatus as defined in claim 3 wherein said antenna coil is adapted to transmit an electromagnetic field (EMF) signal to said identification tag and to receive a return EMF signal from said identification tag, said identification tag being adapted to receive an EMF signal from said antenna coil and to use energy of the received EMF signal to generate a return EMF signal.

5. Apparatus as defined in claim 3 wherein said vehicle seat comprises one of a front passenger seat and a rear passenger seat and a child seat is locatable on said one passenger seat to face rearward of the vehicle.

6. Apparatus as defined in claim 5 wherein said antenna coil is mounted to one of said front passenger seat, said rear passenger seat, and an instrument panel in the vehicle.

7. Apparatus as defined in claim 3 wherein said vehicle seat comprises one of a front passenger seat and a rear passenger seat and a child seat is locatable on said one passenger seat to face forward of the vehicle.

8. Apparatus as defined in claim 7 wherein said antenna coil is mounted to one of said front passenger seat, said rear passenger seat, and an instrument panel in the vehicle.

* * * * *